US011029390B2

United States Patent
Fath et al.

(10) Patent No.: US 11,029,390 B2
(45) Date of Patent: Jun. 8, 2021

(54) METHOD AND SYSTEM FOR PERFORMING A VEHICLE HEIGHT-RADAR ALIGNMENT CHECK TO ALIGN A RADAR DEVICE PROVIDED IN A VEHICLE

(71) Applicant: Ford Motor Company, Dearborn, MI (US)

(72) Inventors: Brian Fath, Farmington Hills, MI (US); Alexandra Taylor, Harbor Springs, MI (US); Muhammad Azhar Aleem, Canton, MI (US); Matthew Miller, Royal Oak, MI (US)

(73) Assignee: Ford Motor Company, Dearborn, MI (US)

( * ) Notice: Subject to any disclaimer, the term of this patent is extended or adjusted under 35 U.S.C. 154(b) by 286 days.

(21) Appl. No.: 16/031,069

(22) Filed: Jul. 10, 2018

(65) Prior Publication Data

US 2020/0018822 A1 Jan. 16, 2020

(51) Int. Cl.
*G01S 7/40* (2006.01)

(52) U.S. Cl.
CPC ..... *G01S 7/4026* (2013.01); *G01S 2007/4034* (2013.01)

(58) Field of Classification Search
CPC ............... G01S 7/4026; G01S 2007/4034
USPC ............................................. 342/173
See application file for complete search history.

(56) References Cited

U.S. PATENT DOCUMENTS

| | | | |
|---|---|---|---|
| 5,535,522 A | 7/1996 | Jackson | |
| 6,363,619 B1 * | 4/2002 | Schirmer | G01S 7/4026 33/288 |
| 6,437,731 B1 * | 8/2002 | Henrio | G01S 7/4026 342/165 |
| 7,337,650 B1 * | 3/2008 | Preston | B60W 40/11 73/1.38 |
| 7,706,978 B2 * | 4/2010 | Schiffmann | G01S 13/931 701/301 |
| 8,892,304 B2 * | 11/2014 | Lu | B60G 17/018 701/37 |

(Continued)

FOREIGN PATENT DOCUMENTS

| | | | | |
|---|---|---|---|---|
| CN | 203364784 U | * | 12/2013 | ............. G01B 17/00 |
| DE | 102017123226 A1 | * | 4/2019 | ............. G06T 7/254 |
| KR | 20140077131 A | * | 6/2014 | ............. B60W 30/16 |

OTHER PUBLICATIONS

Hunter Engineering Company, HawkEye Alignment Featuring WinAlign® Software, available at URL http://www.neweraequipment.com/Hawkeyecatalog.pdf.

*Primary Examiner* — Vladimir Magloire
*Assistant Examiner* — Alexander L. Syrkin
(74) *Attorney, Agent, or Firm* — Burris Law, PLLC (57) ABSTRACT

The present disclosure is directed toward a method and system for checking a vehicle height and radar aim of a vehicle. The method includes estimating, by a forward imaging system disposed in a vehicle, a vehicle height, and determining whether the estimated vehicle height is within a predefined height tolerance. The method further includes performing, by a radar system disposed in the vehicle, a radar alignment test to determine whether a radar device of the radar system is aligned within a predefined angular range, and adjusting the alignment of the radar device in response to the vehicle height being within the predefined height tolerance and the radar device being misaligned.

20 Claims, 4 Drawing Sheets

(56) References Cited

U.S. PATENT DOCUMENTS

| | | | | |
|---|---|---|---|---|
| 8,994,580 | B2* | 3/2015 | Weber | G01S 7/4026 |
| | | | | 342/70 |
| 9,182,477 | B2* | 11/2015 | Jones | G01S 7/4026 |
| 9,523,769 | B2* | 12/2016 | Park | G01S 7/4052 |
| 9,527,509 | B2* | 12/2016 | Kwon | B60Q 9/00 |
| 9,823,337 | B2* | 11/2017 | Heo | G01S 7/4026 |
| 9,865,933 | B2* | 1/2018 | Scheschko | H01Q 15/18 |
| 9,880,262 | B2* | 1/2018 | Hayakawa | G01P 15/00 |
| 10,126,410 | B2* | 11/2018 | Treptow | G01S 7/4026 |
| 10,288,721 | B2* | 5/2019 | Paap | G01B 11/272 |
| 10,458,811 | B2* | 10/2019 | Voeller | G01C 25/00 |
| 10,473,760 | B2* | 11/2019 | Ishimori | G01S 13/584 |
| 10,625,735 | B2* | 4/2020 | Matsunaga | B60W 30/085 |
| 10,852,392 | B2* | 12/2020 | Park | G01S 7/4021 |
| 2007/0124949 | A1 | 6/2007 | Burns, Jr. et al. | |
| 2013/0222592 | A1* | 8/2013 | Gieseke | G08G 1/096708 |
| | | | | 348/148 |
| 2014/0299644 | A1* | 10/2014 | Aleem | B60R 9/06 |
| | | | | 224/555 |
| 2016/0171892 | A1* | 6/2016 | Gieseke | G08G 1/096766 |
| | | | | 348/148 |
| 2016/0178359 | A1* | 6/2016 | Minor | G01B 11/14 |
| | | | | 348/135 |
| 2016/0375592 | A1* | 12/2016 | Szatmary | B25J 9/1676 |
| | | | | 700/255 |
| 2017/0131092 | A1 | 5/2017 | Rogers | |
| 2017/0212215 | A1* | 7/2017 | Hellinger | G01S 13/931 |
| 2019/0056498 | A1* | 2/2019 | Sonn | G01S 17/931 |
| 2019/0079510 | A1* | 3/2019 | Ferris | G05D 1/0038 |
| 2019/0188432 | A1* | 6/2019 | Lozano | G06K 7/10386 |
| 2019/0377065 | A1* | 12/2019 | Miranda | G01S 13/87 |

* cited by examiner

METHOD AND SYSTEM FOR PERFORMING A VEHICLE HEIGHT-RADAR ALIGNMENT CHECK TO ALIGN A RADAR DEVICE PROVIDED IN A VEHICLE

FIELD

The present disclosure relates to aligning an aim of a radar device arranged along a vehicle.

BACKGROUND

The statements in this section merely provide background information related to the present disclosure and may not constitute prior art.

Many driver assistance features of new vehicles use forward looking sensor assemblies, such as a radar system and an imaging system, to detect the environment around the vehicle. For example, a radar assembly detects other vehicles and obstacles on the road by analyzing radio waves reflected from the object. In another example, cameras may be used as part of an imaging system to monitor the road and direction of the vehicle.

Forward radar devices are generally aligned to be parallel to ground within a set angular range. To verify this, a radar target is positioned at the same height as the radar device, and the radar system performs an alignment test. If the height of the vehicle is out of tolerance due to, for example, mis-installed suspension springs or incorrect tires, the height of the vehicle will change. This change directly induces an error in the radar measurement and can lead to unnecessary adjustment or repairs to the radar device when the real issues is with, for example, the suspension or tires. The present disclosure addresses these and other issues related to aligning a radar device.

SUMMARY

This section provides a general summary of the disclosure, and is not a comprehensive disclosure of its full scope or all of its features.

In one form, the present disclosure is directed toward a method that includes estimating, by a forward imaging system disposed in a vehicle, a vehicle height of the vehicle; determining whether the estimated vehicle height is within a predefined height tolerance; performing, by a radar system disposed in the vehicle, a radar alignment test to determine whether a radar device of the radar system is aligned within a predefined angular range; and adjusting the alignment of the radar device in response to the vehicle height being within the predefined height tolerance and the radar device being misaligned.

In another form, the method further includes performing a height correction procedure in response to the estimated vehicle height being outside of the predefined height tolerance.

In yet another form, the height correction procedure is performed prior to the radar system performing the radar alignment test.

In one form, the method further includes requesting, by an alignment controller, the vehicle height from the imaging system and a result of the radar alignment test from the radar system. The alignment controller is external of the vehicle and communicably coupled to the imaging system and the radar system. The alignment controller determines whether the radar device is to be adjusted based on the vehicle height and the result of the radar alignment test.

In another form, the estimating the vehicle height further includes capturing, by a camera of the imaging system, one or more images of a stationary object; and determining, by the imaging system, a position of the camera relative to a feature captured by the one or more images to estimate the vehicle height.

In yet another form, the stationary object depicts a checkered pattern to be identified by the camera.

In one form, the performing the radar alignment test further includes emitting one or more radio waves toward a reference panel positioned a predefined distance from the radar device; calculating an emission angle of the radio waves with respect to a reference axis based on radio waves reflected from the reference panel and received by the radar device; and determining the radar device is misaligned in response to the emission angle being outside the predefined angular range.

In another form, the method further includes aligning an image marker within a field of view of the forward imaging system prior to estimating the vehicle height. The image marker depicts a predefined pattern to be captured in an image by the forward imaging system.

In yet another form, the method further includes aligning a radar marker within a desired radar height of the radar device prior to performing the radar alignment test. The radar marker is configured to reflect radio waves emitted by the radar device.

In one form, the adjusting the alignment of the radar device further includes transmitting a control signal to an adjustment tool attached to a fastener of the radar device to drive the fastener and adjust an aim of the radar device.

In one form, the present disclosure is directed toward an alignment system that includes an alignment controller disposed external of a vehicle and communicably coupled to a forward imaging system and a radar system disposed in the vehicle. The alignment controller is configured to instruct the forward imaging system to estimate the vehicle height and the radar system to perform a radar alignment test to determine whether a radar device of the radar system is aligned. The alignment controller is configured to determine the radar device is misaligned in response to the vehicle height being within a predefined height tolerance and the radar device being outside the predefined angular tolerance.

In yet another form, the alignment controller is configured determine a height correction procedure is to be performed in response to the estimated vehicle height being outside of the predefined height tolerance.

In another form, the alignment controller is connected to a vehicle area network of the vehicle to communicate with the forward imaging system and a radar system.

In one form, the alignment system further includes an image marker that depicts a predefined pattern and a radar marker. The position of the image marker is adjustable and is aligned to be within a field of view of a camera of the forward imaging system. The forward imaging system is configured to identify the predefined pattern and triangulate a position of the camera based on the predefined pattern to estimate the vehicle height. A position of the radar marker is adjustable and is aligned to be at a desired radar height of the radar device of the radar system, and is configured to reflect one or more radio waves emitted by the radar device during the radar alignment test.

In another form, the alignment controller is configured to control the position of the image marker and the radar marker, and deploy the image marker and the radar marker prior to instructing the forward imaging system to estimate the vehicle height and the radar system to perform the radar alignment test.

In yet another form, the alignment system further includes a radar adjustment tool configured to attach to a fastener of the radar device, and operable to adjust an aim of the radar device by driving the fastener.

In one form, the alignment controller controls the radar adjustment tool to adjust the aim of the radar device in response to the radar device being misaligned.

In one form, the present disclosure is directed toward a method that includes instructing, by an alignment controller, a forward imaging system of a vehicle to estimate a vehicle height; Instructing, by the alignment controller, a radar system of the vehicle to perform an alignment test to determine whether a radar device of the radar system is aligned; and adjusting the aim of the radar device in response to the estimated vehicle height being within a predefined height tolerance and the radar device being misaligned.

In another form, the alignment controller is external of the vehicle having the forwarding imaging system and the radar system.

In yet another form, the adjusting the aim of the radar device further includes transmitting a control signal to an adjustment tool attached to a fastener of the radar device to drive the fastener.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
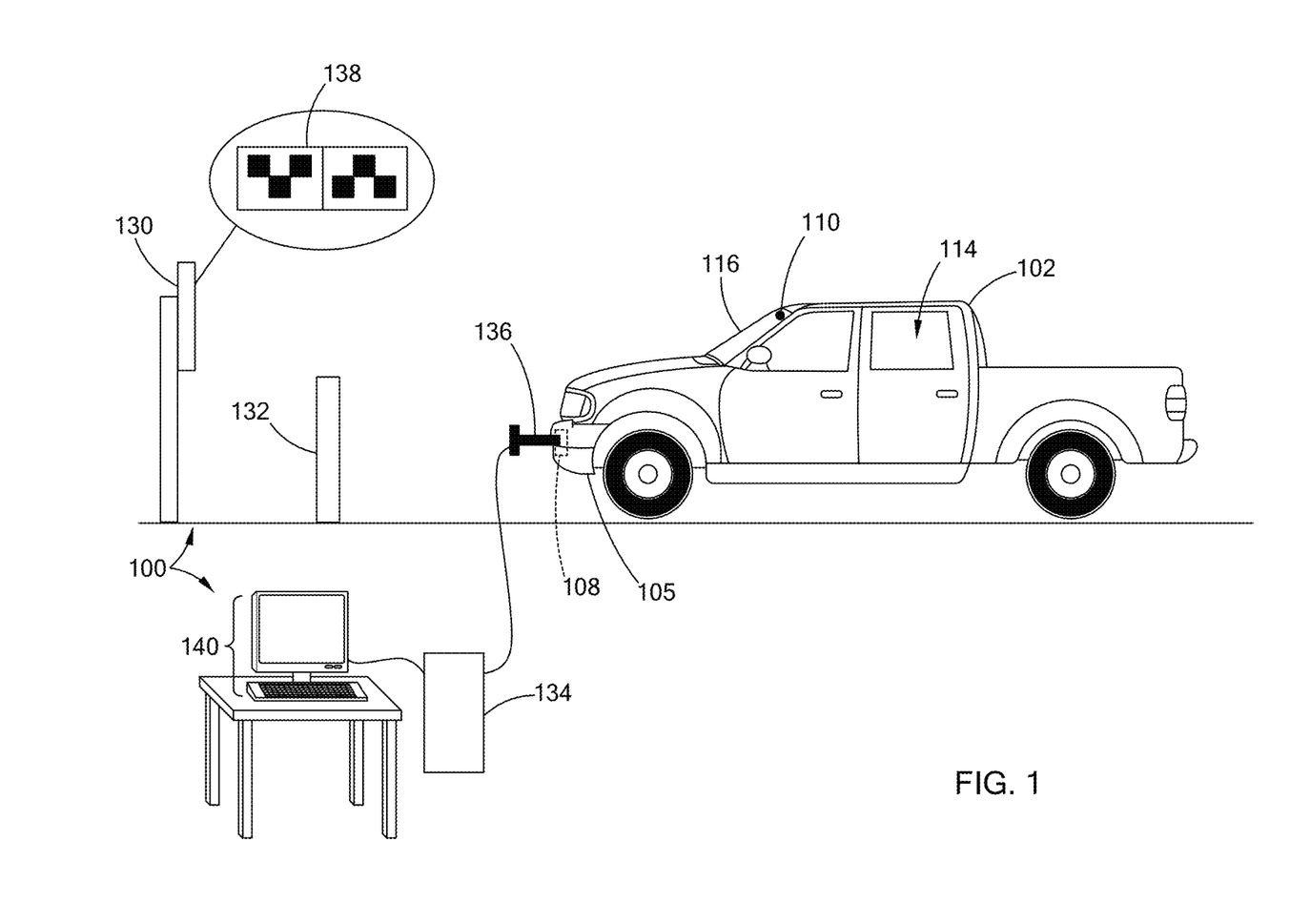
FIG. 1 illustrates a vehicle within a test bay of an alignment system in accordance with the teachings of the present disclosure.
Figure 2:
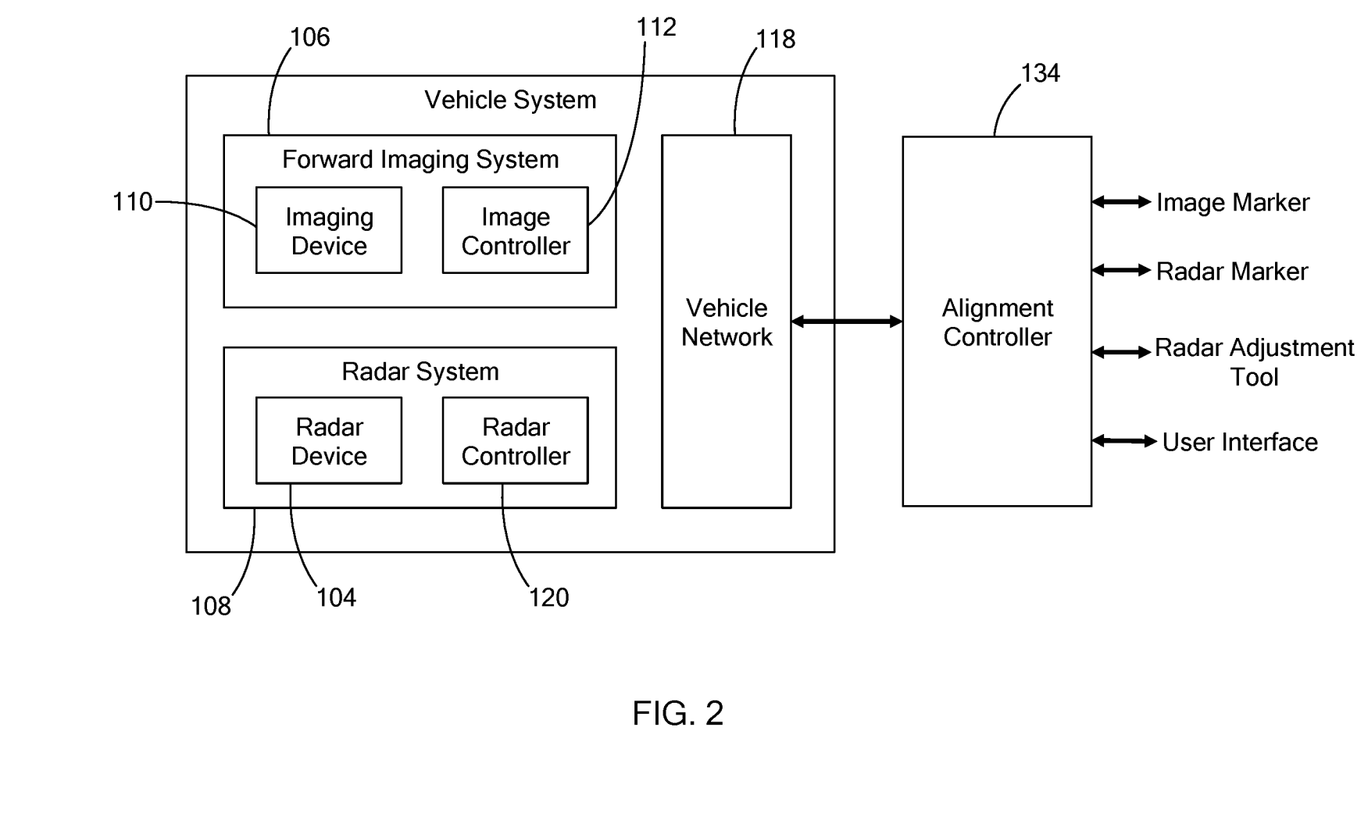
FIG. 2 is a block diagram of a vehicle system and an alignment controller in accordance with the teachings of the present disclosure.

Referring to FIGS. 1-2, during manufacturing, an alignment system 100 of the present disclosure performs a vehicle height-radar alignment check on a vehicle 102 to inspect the height of the vehicle 102 and the angular alignment of one or more radar devices 104 disposed along the bumper 105 of the vehicle 102. In one form, the alignment system 100 is configured to communicate with a forward imaging system 106 and a radar system 108 disposed in the vehicle 102 to perform the check, as described further herein.

The forward imaging system 106 is configured to perform various operations, such as drive lane detection, front view display, and vehicle height measurement. The forward imaging system 106 includes at least one camera 110 (i.e., imaging device) and an image controller 112. In one form, the camera 110 is a digital camera disposed within a passenger cabin 114 of the vehicle 102 along or in proximity to a windshield 116. The camera 110 is arranged to capture one or more images of an area in front of the vehicle 102 (i.e., a forward direction) and within a field of view of the camera 110. The image controller 112 may be located with the camera 110 or at another location within the vehicle 102. The image controller 112 is communicably coupled to a vehicle network 118, such as a control area network (CAN), or local interconnect network (LIN), to communicate with other controllers within the vehicle 102 and/or an external controller.

In addition to other processes, the image controller 112 is configured to estimate the vehicle height based on the images captured by the camera 110. For example, a camera 110 captures one or more images of a stationary object positioned in front of the vehicle. In one form, the stationary object is positioned a preset height from ground and a preset distance from the vehicle 102. The stationary object illustrates a predefined pattern that is detectable by the image controller 112. The image controller 112 processes the images of the stationary object to identify the pattern, and uses known triangulation algorithms to estimate the vehicle height. For example, in one form, the image controller 112 is configured to determine a plane defined by the predetermined pattern, and then triangulates the position of the camera 110 with respect to the plane to determine the roll, pitch and height of the camera 100, which is then used to estimate the vehicle height. Other suitable methods for estimating the vehicle height may also be used while remaining within the scope of the present disclosure, such as a gantry based camera system, a laser system to identify the height from ground of a known point on the frame of the vehicle, or using a probe that extends out to a point on the frame.

Figure 3:
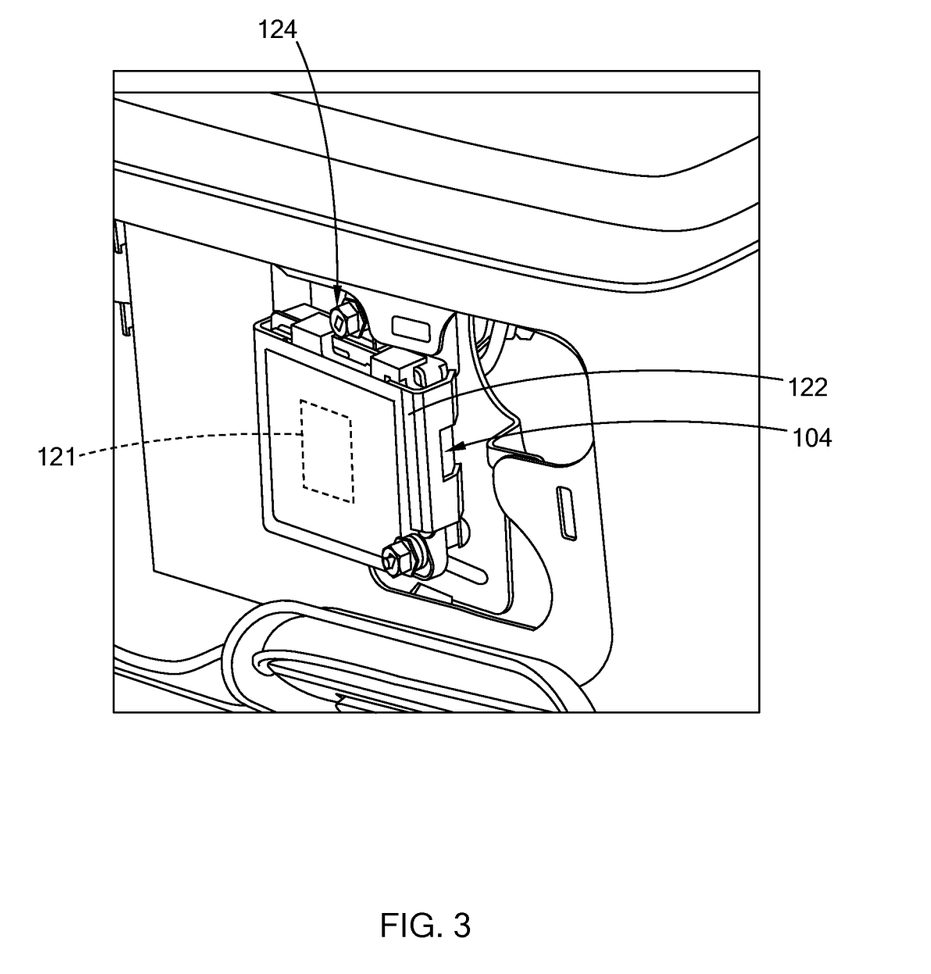
FIG. 3 illustrates a radar device arranged along a bumper of the vehicle.

The radar system 108 is operable to detect potential obstacles, such as other vehicles and/or objects, that are located in front of the vehicle 102. The radar system 108 includes the radar device 104 disposed along the bumper 105 of the vehicle 102 and a radar controller 120 configured to operate the radar device 104 and analyze data from the device 104. Referring to FIG. 3, the radar device 104 includes a radar antenna 121 and a case 122 that houses the radar antenna. In one form, the radar device 104 is aligned to be parallel to ground within a set angular range (e.g., +/−3 degrees) to have the radar system 108 detect a predefined distance in front of the vehicle 102 (e.g., 100*m*). The aim (i.e., angular position) of the radar device 104 may be adjusted by way of a fastener 124 provided at the case 122.

The radar controller 120 is configured to operate the radar device 104 and determine whether an object is in front of the vehicle 102 based on data from the radar device 104. If more than one radar device is provided, a single radar controller 120 may be used to operate the radar devices. Alternatively, more than one radar controller may be employed for operating the radar devices. Like the image controller 112, the radar controller 120 is communicably coupled to the vehicle network 118 to communicate with other controllers within the vehicle 102 and/or an external controller. Accordingly, the radar controller 120 is configured to transmit information regarding a detected object to other controllers via the vehicle network.

In operation, the radar device 104 emits radio waves at a first frequency and receives reflected radio waves that are at a second frequency different from the first frequency. The radar controller 120 is configured to analyze the received waves using known algorithms to determine, for example, whether an object is present in front of the vehicle 102, the distance of the object, and/or the speed of the object. For example, in one form, the radar system 108 is configured to a known pulse-Doppler method in which the radar transmitter operates for a short period, and then the system 108 switches to receive mode until the next transmit pulse. In the receive mode, the reflections are processed together to extract range and relative motion of one or more detected objects. Other suitable methods for operating the radar device and detecting object may be used while remaining within the scope of the present disclosure. For example, in lieu of the radar device, the forward imaging system may be used to verify the height of the radar.

Misalignment of the radar device 104 can affect the performance of the radar system 108 and result in errors, such as erroneous detection of the road as an object. Accordingly, in addition to detecting objects during routine vehicle operation, the radar controller 120 is configured to perform a radar alignment test to determine whether the radar device 104 is aligned within the set angular range. For example, an object is positioned a set distance and height from the radar device 104. The radar controller 120 operates the radar device 104 to emit the radio waves, and analyze the received waves to determine whether the aim of the radar device 104 is within the set angular range. If the aim is outside the range, the radar controller 120 may output this information to another controller within the vehicle (e.g., main engine controller) or to an external controller. For example, in one form, the radar controller outputs data indicating a pass or fail result, and an estimate of the aim misalignment of the radar device 104.

The alignment system 100 of the present disclosure utilizes the forward imaging system 106 and the radar system 108 provided within the vehicle 102 to perform the vehicle height-radar alignment check. More particularly, the alignment system 100 obtains an estimated vehicle height from the forward imaging system and the results of the radar alignment test performed by the radar system. Using the two outputs, the alignment system 100 verifies the output of one based on the output of the other, as described further below.

With continuing reference to FIGS. 1 and 2, the alignment system 100 includes an image marker 130, a radar marker 132, an alignment controller 134, and a radar adjustment tool 136. The image marker 130 and the radar marker 132, which are collectively referred to as markers 130 and 132, are positioned in front of the vehicle 102 at respective set distances and heights. The height and distance of the markers 130 and 132 are predetermined and based on the type of vehicle being evaluated. In one form, each of the markers 130 and 132 is attached to an automated support structure (not shown) that includes, for example, a frame upon which the marker is mounted and a motor that is operable to move the frame.

In one form, the image marker 130, as a stationary object, is arranged within a field of view of the camera 110 of the forward imaging system 106, and illustrates a pattern or a figure, such as a checkered pattern 138. The forward imaging system 106 estimates the vehicle height based on the image(s) taken of the image marker 130 using the process described above.

The radar marker 132 includes reflectors (not shown) to reflect the radio waves from the radar device 104. In one form, the radar marker 132 is configured to be at the same height as the radar device 104 to match the design intent ride height of the radar device for a given vehicle (i.e. desired radar height). The center between two reflectors (i.e., radar target) is positioned at an intended height of the radar device 104). Accordingly, deviation in height translates to an angular error, such as: ($\tan^{-1}$ (height error/2500 mm), where 2500 mm is the set distance between the radar device 104 and the radar marker 132. If this angular error is outside the set angular range (e.g., +/−3-degrees), the radar device 104 is determined to be misaligned.

The alignment controller 134 is configured to execute the vehicle height-radar alignment check and is operable by an operator (e.g., plant engineer, technician, etc.) by way of one or more user interfaces 140, such a keyboard, a display, and/or a barcode scanner. In one form, the alignment controller 134 is configured to control the position of the each of the markers 130 and 132 by operating the automated structural support for each of the markers 130 and 132. Alternatively, a separate controller (e.g., support controller) may be used to operate the automated structural support, and the alignment controller 134 is communicably coupled to the support controller to have the controller adjust the position of the markers 130 and 132.

To align the position of the markers 130 and 132, the alignment controller 134 obtains information regarding the desired position of the markers 130 and 132 based on the type of vehicle being test. More particularly, in one form, the alignment controller 134 is communicably coupled to an external server that stores information regarding each vehicle type being tested. This information includes position information related to the markers 130 and 132, predefined radar tolerances, and height tolerances. For example, during the check, an operator may scan the vehicle-identification-number (VIN) using the scanner, and the alignment controller 134 obtains information related to the vehicle from the external server using the VIN. Alternatively, the alignment controller 134 may be configured to store the same information obtained from the external server in a memory, and obtain the information directly from the memory based on the scanned VIN.

To exchange information with the forward imaging system 106 and the radar system 108, the alignment controller 134 is communicably coupled to the vehicle network 118 via, for example, a cable. The vehicle height-radar alignment check, utilizes the forward imaging system 106 and the radar system 108 provided within the vehicle to verify measurements taken by the other. More particular, the alignment controller 134 is configured to instruct the forward imaging system 106 to estimate the vehicle height and instruct the radar system to perform the alignment test of the radar device 104. If the vehicle height is outside a height tolerance (e.g., +/−5 mm), then it is expected that the radar device 104 is misaligned, and the vehicle 102 may undergo a height correction procedure. Alternatively, if the vehicle is within the height tolerance, the radar device 104 is expected to be aligned. However, if the radar device is not aligned, the alignment controller 134 determines such misalignment is not due to the vehicle height and thus, adjusts the radar device 104 using the radar adjustment tool 136, and instructs the radar system 108 to perform the alignment test again to determine whether the radar device 104 is still misaligned.

The radar adjustment tool 136 is operable to adjust the aim of the radar device 104 by driving the fastener 124 of the radar device 104. In one form, the adjustment tool 136 is a power tool that is configured to engage with the fastener 124, and is communicably coupled to the alignment controller 134 via a cable. Based on the measured misalignment of the radar device 104, the alignment controller 134 transmits a control signal to the tool 136 to drive the fastener 124 and thus, change the aim of the radar device 104 with respect to ground. For example, in one form, the fastener 124 is a bolt and the adjustment tool 136 is a nut driver that is operable to drive (i.e., rotate) the nut in a clockwise direction to decrease the angular position with respect to ground or in a counterclockwise direction to increase the angular position. Alternatively, in another form, the adjustment tool 136 is a tool operable to a technician that drives the fastener 124 a certain number of rotations based on an output from the alignment tool 136.

Figure 4:
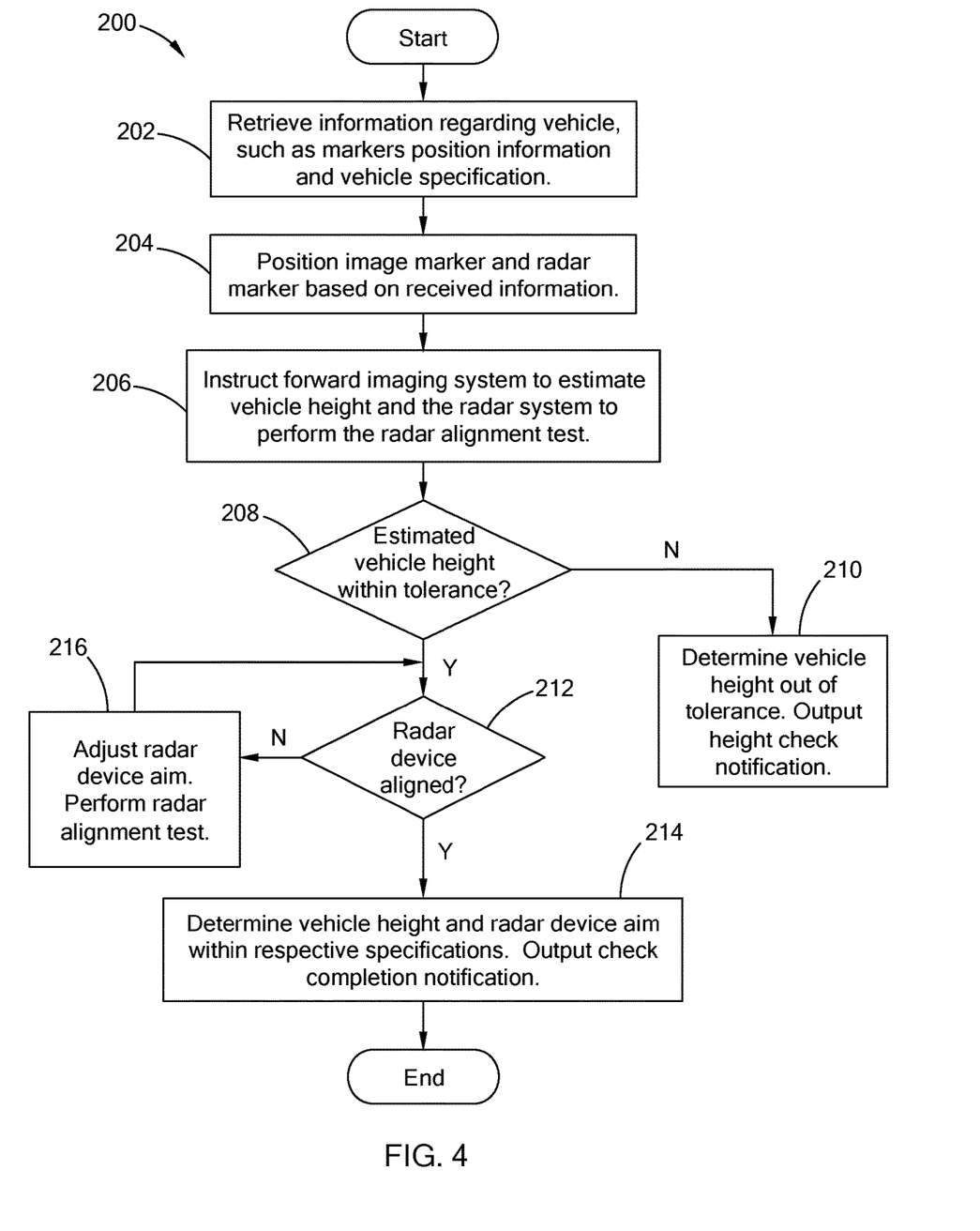
FIG. 4 is a flowchart of a vehicle height-radar alignment check in accordance with the teachings of the present disclosure.

Referring to FIG. 4, an example vehicle height-radar alignment check 200 executable by the alignment system 100 is provided. In one form, the check 200 is performed when the vehicle is positioned at the testing area and the VIN of the vehicle is scanned. At 202, the system obtains information regarding the vehicle using the VIN, such as the markers position and vehicle specification, which defines the height tolerance and radar range. This information can be retrieved from an external server or can be stored and retrieved from a memory of the alignment controller. At 204, the system positions the image marker and the radar marker in front of the vehicle based on the information obtained, and at 206 instructs the forward imaging system to estimate the vehicle height and the radar system to perform the radar alignment test.

At 208, the system determines whether the vehicle height is within a preset height tolerance. If not, the system, at 210, determines the vehicle height is out of tolerance and outputs a height check notification that indicates additional check of the vehicle height is required. For example, the system may output a message on the display that indicates the vehicle height is out of tolerance and a height correction procedure should be performed. The height correction procedure may include examining the wheels, suspension, and other components that influence vehicle height.

If the vehicle height is within the tolerance, the system, at 212, determines whether the radar device is aligned. For example, the data from the radar system indicates whether the radar device is aligned, and if not, the aim misalignment of the device. If the radar device is aligned, the system determines the vehicle height and the aim of the radar device are within their respective specification, and outputs a check completion notification, at 214. For example, the system may output a notification via the display indicating that the vehicle height-radar alignment check is complete. The notification may include additional information such as the estimated vehicle height and the aim of the radar device (i.e., angular position) provided by the forward imaging system and the radar system, respectively. In addition, the notification may also be a an audio notification, optical notification (e.g., light indicators), or any other suitable form of communication.

If the radar device is misaligned, the system adjusts the aim of the radar device using the radar adjustment tool, and then requests the radar system to perform the radar alignment test again, at 216. For example, with the adjustment tool positioned at the fastener, the system transmits a control signal to the tool to drive the fastener. Accordingly, the system is configured to detect and then address a misaligned radar device within the same check. Alternatively, in lieu of adjusting the aim automatically, the system may notify the operator that the radar device is misaligned, and the operator may manually adjust the position of the radar device. Once adjusted, the radar system performs the alignment test and the system returns to 212 to determine if the radar device is still misaligned.

The vehicle height-radar alignment check 200 may be modified in various suitable ways while remaining within the scope of the present disclosure. For example, the system may separate the estimation of the vehicle height and the performance of the radar alignment test. For instance, the system may deploy the image marker, have the forward imaging system estimate the vehicle height, and determine whether the vehicle height is with the height tolerance before performing the radar alignment test. Accordingly, the vehicle height can be checked prior to evaluating the radar aim.

In the foregoing, a "controller" may be provided as a computing device having one or more processors, memory for storing computer readable instructions executed by the processors, a communication input/output for computing with other controllers/devices, and other suitable components.

The alignment system of the present disclosure utilizes the forward imaging system and the radar system provided within the vehicle to verify measurements taken by the other. Specifically, the system obtains the estimated height from the forward imaging system to verify that the vehicle height is within a set tolerance and to determine whether the output of the radar alignment test correlates to the vehicle height. Based on the estimated height, the alignment system determines whether the radar device is misaligned, and adjusts the radar device in response to the misalignment. That is, the system can confirm that a misaligned radar device is not due to the vehicle height, and address the radar aim during the check without having to move the vehicle.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising:
   estimating, by a forward imaging system disposed in a vehicle, a vehicle height of the vehicle;
   determining whether the estimated vehicle height is within a predefined height tolerance;
   performing, by a radar system disposed in the vehicle, a radar alignment test to determine whether a radar device of the radar system is aligned within a predefined angular range; and
   adjusting the alignment of the radar device in response to the vehicle height being within the predefined height tolerance and the radar device being misaligned.

2. The method of claim 1 further comprising performing a height correction procedure in response to the estimated vehicle height being outside of the predefined height tolerance.

3. The method of claim 2, wherein the height correction procedure is performed prior to the radar system performing the radar alignment test.

4. The method of claim 1 further comprising:
   requesting, by an alignment controller, the vehicle height from the imaging system and a result of the radar alignment test from the radar system, wherein:

the alignment controller is external of the vehicle and communicably coupled to the imaging system and the radar system, and the alignment controller determines whether the radar device is to be adjusted based on the vehicle height and the result of the radar alignment test.

5. The method of claim 1, wherein the estimating the vehicle height further comprises:

capturing, by a camera of the imaging system, one or more images of a stationary object; and determining, by the imaging system, a position of the camera relative to a feature captured by the one or more images to estimate the vehicle height.

6. The method of claim 5, wherein the stationary object depicts a checkered pattern to be identified by the camera.

7. The method of claim 1, wherein the performing the radar alignment test further comprises:

emitting one or more radio waves toward a reference panel positioned a predefined distance from the radar device;

calculating an emission angle of the radio waves with respect to a reference axis based on radio waves reflected from the reference panel and received by the radar device; and determining the radar device is misaligned in response to the emission angle being outside the predefined angular range.

8. The method of claim 1 further comprising aligning an image marker within a field of view of the forward imaging system prior to estimating the vehicle height, wherein the image marker depicts a predefined pattern to be captured in an image by the forward imaging system.

9. The method of claim 1 further comprising aligning a radar marker within a desired radar height of the radar device prior to performing the radar alignment test, wherein the radar marker is configured to reflect radio waves emitted by the radar device.

10. The method of claim 1, wherein the adjusting the alignment of the radar device further comprises: transmitting a control signal to an adjustment tool attached to a fastener of the radar device to drive the fastener and adjust an aim of the radar device.

11. An alignment system comprising:

an alignment controller disposed external of a vehicle and communicably coupled to a forward imaging system and a radar system disposed in the vehicle, wherein:

the alignment controller is configured to instruct the forward imaging system to estimate the vehicle height and the radar system to perform a radar alignment test to determine whether a radar device of the radar system is aligned, and the alignment controller is configured to determine the radar device is misaligned in response to the vehicle height being within a predefined height tolerance and the radar device being outside the predefined angular tolerance.

12. The alignment system of claim 11, wherein the alignment controller is configured to determine a height correction procedure is to be performed in response to the estimated vehicle height being outside of the predefined height tolerance.

13. The alignment system of claim 11, wherein the alignment controller is connected to a vehicle area network of the vehicle to communicate with the forward imaging system and the radar system.

14. The alignment system of claim 11 further comprising:

an image marker depicting a predefined pattern, wherein the position of the image marker is adjustable and is aligned to be within a field of view of a camera of the forward imaging system, and the forward imaging system is configured to identify the predefined pattern and triangulate a position of the camera based on the predefined pattern to estimate the vehicle height; and a radar marker, wherein a position of the radar marker is adjustable and is aligned to be at a desired radar height of the radar device of the radar system, and is configured to reflect one or more radio waves emitted by the radar device during the radar alignment test.

15. The alignment system of claim 14, wherein the alignment controller is configured to:

control the position of the image marker and the radar marker, and deploy the image marker and the radar marker prior to instructing the forward imaging system to estimate the vehicle height and the radar system to perform the radar alignment test.

16. The alignment system of claim 11 further comprising a radar adjustment tool configured to attach to a fastener of the radar device, and operable to adjust an aim of the radar device by driving the fastener.

17. The alignment system of claim 16, wherein the alignment controller controls the radar adjustment tool to adjust the aim of the radar device in response to the radar device being misaligned.

18. A method comprising:

instructing, by an alignment controller, a forward imaging system of a vehicle to estimate a vehicle height;

instructing, by the alignment controller, a radar system of the vehicle to perform an alignment test to determine whether a radar device of the radar system is aligned; and adjusting the aim of the radar device in response to the estimated vehicle height being within a predefined height tolerance and the radar device being misaligned.

19. The method of claim 18, wherein the alignment controller is external of the vehicle having the forwarding imaging system and the radar system.

20. The method of claim 18, wherein the adjusting the aim of the radar device further comprises: transmitting a control signal to an adjustment tool attached to a fastener of the radar device to drive the fastener.

* * * * *